United States Patent
Hawley

(10) Patent No.: US 11,407,400 B2
(45) Date of Patent: Aug. 9, 2022

(54) CONTROL OF AUTOMATIC TRANSMISSION DURING CHARGING OF A BATTERY IN A HYBRID-ELECTRIC VEHICLE

(71) Applicant: Toyota Motor Engineering & Manufacturing North America, Inc., Plano, TX (US)

(72) Inventor: Thomas S. Hawley, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 241 days.

(21) Appl. No.: 16/890,347

(22) Filed: Jun. 2, 2020

(65) Prior Publication Data

US 2021/0370908 A1 Dec. 2, 2021

(51) Int. Cl.
*B60W 20/13* (2016.01)
*B60L 58/15* (2019.01)

(52) U.S. Cl.
CPC ............ *B60W 20/13* (2016.01); *B60L 58/15* (2019.02)

(58) Field of Classification Search
None
See application file for complete search history.

(56) References Cited

U.S. PATENT DOCUMENTS

| | | | |
|---|---|---|---|
| 9,026,293 B2* | 5/2015 | Ito | B60K 6/445 180/65.265 |
| 2011/0231048 A1* | 9/2011 | Matsubara | B60W 10/30 903/902 |
| 2014/0335995 A1* | 11/2014 | Swales | F16H 57/037 477/3 |
| 2021/0080004 A1* | 3/2021 | Palejiya | B60K 6/547 |

* cited by examiner

*Primary Examiner* — Todd Melton
*Assistant Examiner* — Jason R Roberson
(74) *Attorney, Agent, or Firm* — Christopher G. Darrow; Darrow Mustafa PC

(57) ABSTRACT

A system for controlling charging of a battery in a hybrid-electric vehicle. The system is configured to estimate a total vehicle power requirement and an available internal combustion engine power provided by the engine in each gear of a transmission system of the vehicle. The system may then determine a highest gear of the transmission system that has an estimated available power at least equal to the estimated total vehicle power requirement. The system may then, responsive to a state of charge of the battery falling below a predetermined low-charge threshold, and if the transmission system is not currently in the highest gear that has an estimated available power at least equal to the estimated total power requirement, control operation of the vehicle to shift the transmission system to the highest gear that has an estimated available power at least equal to the estimated total power requirement.

12 Claims, 4 Drawing Sheets

CONTROL OF AUTOMATIC TRANSMISSION DURING CHARGING OF A BATTERY IN A HYBRID-ELECTRIC VEHICLE

TECHNICAL FIELD

The subject matter described herein relates to hybrid-electric vehicles and, more particularly, to control of the operating gear of an automatic transmission during use of an internal combustion engine to charge a battery in a hybrid-electric vehicle.

BACKGROUND

A parallel hybrid-electric vehicle may be powered by either (or both of) an electric motor and an internal combustion engine. Under certain conditions, the vehicle may switch over from electric motor power to internal combustion engine power and vice versa. The battery may become depleted and require recharging. A portion of the power generated by the internal combustion engine may be used to charge the battery by operating the electric motor as a generator. However, the power used in charging the battery is unavailable for operating the vehicle during driving. Thus, the driver may feel the diminished available vehicle power if added vehicle acceleration is needed during battery charging.

SUMMARY

In one aspect of the embodiments described herein, a system for controlling charging of a battery in a hybrid-electric vehicle is provided. The system includes one or more processors and a memory communicably coupled to the one or more processors. The memory stores a required power estimation module including computer-readable instructions that when executed by the one or more processors cause the one or more processors to estimate a total vehicle power requirement. The memory also stores a transmission system control module including computer-readable instructions that when executed by the one or more processors cause the one or more processors to estimate an available internal combustion engine power provided by the engine in each gear of a transmission system of the vehicle. The transmission system control module may then determine a highest gear of the transmission system that has an estimated available power at least equal to the estimated total vehicle power requirement. The transmission system control module may then, responsive to a state of charge of the battery falling below a predetermined low-charge threshold, and if the transmission system is not currently in the highest gear that has an estimated available power at least equal to the estimated total vehicle power requirement, control operation of the vehicle to shift the transmission system to the highest gear that has an estimated available power at least equal to the estimated total vehicle power requirement.

In another aspect of the embodiments described herein, a non-transitory computer readable medium is provided for controlling charging of a battery in a hybrid-electric vehicle by an internal combustion engine of the vehicle. The medium stores instructions that when executed by one or more processors cause the one or more processors to estimate a total vehicle power requirement. An estimate of an available internal combustion engine power provided by the engine in each gear of a transmission system of the vehicle may be determined. A highest gear of the transmission system that has an estimated available power at least equal to the estimated total vehicle power requirement may be determined. A determination may be made that a state of charge of the battery has fallen below a predetermined low-charge threshold. If the vehicle transmission system is not in the highest gear that has an estimated available power at least equal to the estimated total vehicle power requirement when the state of charge falls below the predetermined low-charge threshold, operation of the vehicle may be controlled to shift the transmission system to the highest gear that has an estimated available power at least equal to the estimated total vehicle power requirement after the state of charge falls below the predetermined low-charge threshold. Then, operation of the vehicle may be controlled to start charging of the battery by the internal combustion engine. If a current gear the transmission system is in the highest gear that has an estimated available power at least equal to the estimated total vehicle power requirement when the state of charge falls below the predetermined low-charge threshold, operation of the vehicle may be controlled to start charging of the battery by the internal combustion engine. In addition, operation of the vehicle may be controlled so as to prevent automatic shifting of the transmission system out of the current gear until a gear higher than the current gear has an estimated available power at least equal to the estimated total vehicle power requirement. Also, operation of the vehicle may be controlled to charge the battery until the state of charge of the battery is at or above a predetermined high-charge threshold.

In yet another aspect of the embodiments described herein, a method for charging a battery in a hybrid-electric vehicle is provided. The method comprises steps of continuously estimating a total vehicle power requirement, continuously estimating an available internal combustion engine power provided by the engine in each gear of a transmission system of the vehicle, and continuously determining a highest gear of the transmission system that has an estimated available power at least equal to the estimated total vehicle power requirement. The method also includes determining when a state of charge of the battery has fallen below a predetermined low-charge threshold. The method also includes a step of, if the transmission system is not in the highest gear that has an estimated available power at least equal to the estimated total vehicle power requirement when the state of charge falls below the predetermined low-charge threshold, controlling operation of the vehicle to shift the transmission system to the highest gear that has an estimated available power at least equal to the estimated total vehicle power requirement after the state of charge falls below the predetermined low-charge threshold. The method also includes a step of, after shifting the gear, controlling operation of the vehicle to start charging of the battery by the internal combustion engine. The method also includes a step of, if a current gear the transmission system is in the highest gear that has an estimated available power at least equal to the estimated total vehicle power requirement when the state of charge falls below the predetermined low-charge threshold, controlling operation of the vehicle to start charging of the battery by the internal combustion engine. The method also includes steps of continuously controlling operation of the vehicle so as to prevent automatic shifting of the transmission system out of the current gear until a gear higher than the current gear has an estimated available power at least equal to the estimated total vehicle power requirement, and continuously controlling operation of the vehicle to charge the battery until the state of charge of the battery is at or above a predetermined high-charge threshold.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a system for controlling charging of a battery in a hybrid-electric vehicle. The system estimates a total vehicle power requirement. The system also estimates an available internal combustion engine power provided by the engine in each gear of a transmission system of the vehicle. The system determines a highest gear of the transmission system that has an estimated available power at least equal to the estimated total vehicle power requirement. Responsive to a state of charge of the battery falling below a predetermined low-charge threshold, and if the transmission system is not currently in the highest gear that has an estimated available power at least equal to the estimated total vehicle power requirement, the system controls operation of the vehicle to shift the transmission system to the highest gear that has an estimated available power at least equal to the estimated total vehicle power requirement. The transmission system is then maintained in (or is dynamically shifted to) the highest gear that has an estimated available power at least equal to the estimated total vehicle power requirement, until the battery is charged. Determining and maintaining the transmission system in this gear during battery charging helps ensure that sufficient engine power is available to simultaneously operate the vehicle and charge the battery. The estimated total vehicle power requirement and the estimated available internal combustion engine power may be continuously or periodically redetermined during operation of the vehicle.

Figure 1:
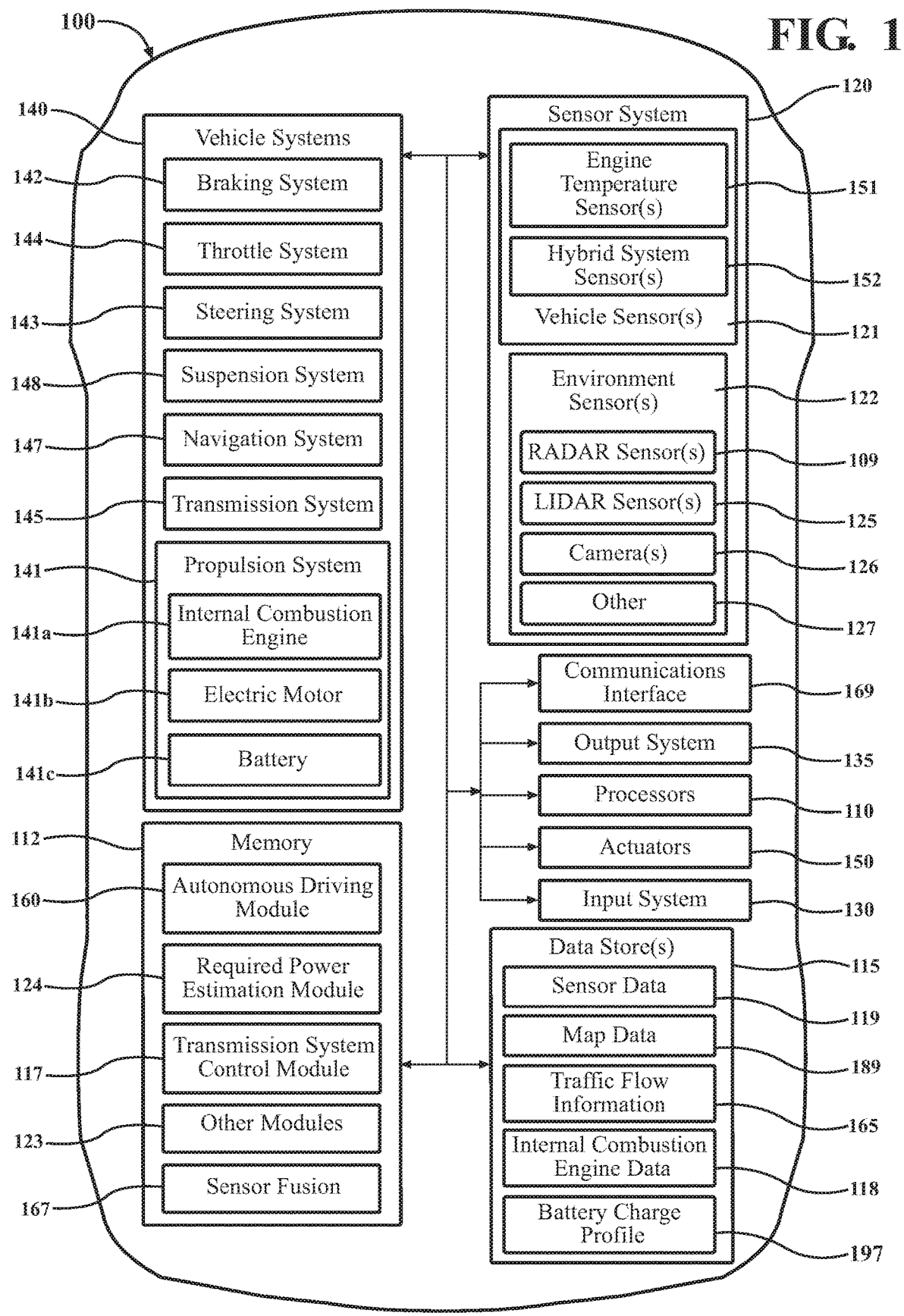
FIG. 1 shows a block schematic diagram of a vehicle 100 incorporating a system for controlling charging of a battery in a parallel hybrid-electric vehicle, in accordance with embodiments described herein.

Referring to FIG. 1, an example of a vehicle 100 is illustrated. As used herein, a "vehicle" is any form of motorized transport. In one or more implementations, the vehicle 100 is a parallel hybrid electric passenger vehicle. In this type of vehicle, both an electric motor and an internal combustion engine are operably connected to the vehicle transmission and work together to power the vehicle. In certain driving scenarios where power demands are low, the electric motor may be used as a generator to recharge the hybrid-electric system battery. In scenarios where the power demand is sufficiently low, the vehicle may be powered by the electric motor without activating the internal combustion engine. An electronic control unit (ECU) or propulsion system controller may control operations of the electric motor and the internal combustion engine. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating a system for controlling charging of a battery in a parallel hybrid-electric vehicle, in accordance with embodiments described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more radar sensors 109 of the sensor system 120.

In one or more arrangements, the one or more data stores 115 can include map data 189. The map data 189 can include maps of one or more geographic areas. In some instances, the map data 189 can include information or data on roads, traffic control devices, road markings, structures, features of interest, and/or landmarks in the one or more geographic areas. The map data 189 can be in any suitable form. In some instances, the map data 189 can include aerial views of an area. In some instances, the map data 189 can include ground views of an area, including 360-degree ground views. The map data 189 can include measurements, dimensions, distances, and/or information for one or more items included in the map data 189 and/or relative to other items included in the map data 189. The map data 189 can include a digital map with information about road geometry, road grades and slopes, and other road information, including information about the road on which the vehicle 100 is currently traveling. The map data 189 can be high quality and/or highly detailed. In one or more arrangements, the map data 189 may be updated continuously (i.e., as soon as information relating to revisions becomes available) or regularly from a cloud source or other source exterior of the vehicle.

The data stores 115 may store traffic flow information 165 describing traffic conditions on the road on which the vehicle 100 is traveling. Traffic flow information 165 may include data (such as records of vehicle speeds, accelerations, traffic density, etc.) associated with navigational coordinates, times of day at which the traffic data is acquired, and other information. This data may be processed to provide estimates of speeds and accelerations that may be required by the vehicle 100 when traveling on a stretch of road including the pertinent navigational coordinates of the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or other element(s) of the vehicle 100 (including any of the elements shown in FIG. 1).

The sensor system 120 can include any suitable type of sensor. Various examples of different types of sensors will be described herein. However, it will be understood that the embodiments are not limited to the particular sensors described. Various examples of sensors of the sensor system 120 are described herein. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information to (and/or receipt of information from) a cloud or other storage facility or for vehicle-to-vehicle (V2V) or vehicle-to-everything (V2X) communications. The sensors may also be operably connected to other vehicle systems and components, such as data stores 115 and processor(s) 110, for storage and processing of vehicle and environment sensor data. Sensor system 120 may include sensors configured to detect the current state or status of vehicle systems and components and to generate indications (for example, using trouble codes) possible malfunctions of vehicle systems and components.

Sensors of the sensor system 120 may include (or be operably connected to) one or more timers or clocks (not shown) configured to enable acquisition, tracking, storage, generation and/or processing of time-correlated sensor data. That is, data acquired by the sensors described herein may be monitored and recorded over one or more predetermined time periods to determine time-related variations in the parameters monitored by the sensors.

The sensor system 120 can include one or more vehicle sensors 121. The vehicle sensor(s) 121 can detect, determine, and/or sense information about the vehicle 100 itself and/or any occupants inside the vehicle. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, tire rotation sensors and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed and acceleration/deceleration of the vehicle 100. The vehicle sensor(s) 121 may include vehicle directional sensors (not shown) configured to determine a current heading of the vehicle or direction in which the vehicle is pointed. The vehicle sensor(s) 121 may include sensors configured to sense aspects of the vehicle mechanical and electrical components and/or systems, to aid in determining a mechanical condition of the vehicle and existing and/or potential problems with the vehicle.

The vehicle sensor(s) 121 may include temperature sensor(s), including temperature sensor(s) 151 configured to measure temperature(s) in the internal combustion engine 141a. The vehicle sensor(s) 121 may include one or more hybrid system component status sensors 152, including sensor(s) configured to measure and track a state of charge (SOC) of the hybrid-electric system battery 141c and sensors for detecting (or providing data enabling estimation or determination of) power demands on the electric motor 141b as a function of time. The vehicle sensor(s) 121 may include pedal sensor(s) configured to measure the positions, displacements, and time rates of change of positions of the accelerator and brake pedals. The vehicle sensor(s) 121 may include sensors and other elements and/or systems directed to measuring or estimating the mass of the vehicle 100 and a "road load" on the vehicle.

The sensor system 120 can include one or more environment sensors 122 configured to acquire data of at least a portion of the external environment of the vehicle 100 (e.g., nearby objects). The environment sensors 122 may detect data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, atmospheric pressure, other vehicles, etc. As an example, in one or more arrangements, the environment sensors 122 can include one or more radar sensors 109, one or more LIDAR sensors 125, one or more cameras 126, and/or other types of sensors 127. Environment sensors 122 may be configured to detect aspects of road geometry, road grade/slope, traffic conditions, movements and characteristics of other vehicles, and other external events and conditions.

Environment sensors such as radar 109, LIDAR 125, camera(s) 126, and/or other sensors may also be usable to monitor the speed, acceleration, position, and other characteristics of any other vehicle in close proximity to the vehicle 100. Environment sensors 122 may be configured to detect activation and deactivation of turn signals, brake lights, and other signals mounted on other vehicles or along a road. Environment sensors 122 may be configured to detect the presence of traffic control elements such as traffic lights, signage, etc., and to interpret and process any indications or messages conveyed by such elements.

Referring again to FIG. 1, a sensor fusion algorithm 167 may be an algorithm (or a computing device storing an algorithm) configured to accept data from the sensor system 120 as an input. The data may include, for example, data representing information sensed at the sensors of the sensor system 120. The sensor fusion algorithm 167 may include or be configured to be executed using, for instance, a Kalman filter, Bayesian network, or other algorithm. The sensor fusion algorithm 167 may provide various assessments based on the data from sensor system 120. Depending upon the embodiment, the assessments may include evaluations of individual objects and/or features in the environment of vehicle 100, evaluations of particular situations, and/or evaluations of possible impacts based on the particular situation. Other assessments are possible.

The vehicle wireless communications interface 169 may be configured to enable and/or facilitate communication between the components and systems of the vehicle and entities (such as cloud facilities, cellular and other mobile communications devices, other vehicles, remote servers, pedestrians, etc.) exterior of the vehicle. Wireless communications interface 169 may be configured to facilitate, establish, maintain, and end wireless V2V and V2X communications with any extra-vehicular entity, for example other connectibly-configured vehicles and connected vehicles, pedestrians, servers and entities located in the cloud, edge servers, and other information sources and entities. Information such as sensor data, traffic information, road condition information, weather information, and other types of information may be transmitted and received via the communications interface 169. Wireless communications interface 169 may incorporate or be in communication with any network interfaces needed to communicate with any extra-vehicular entities and/or networks.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. The vehicle 100 can also include an output system 135. An "output system" includes any device, component, or arrangement or groups thereof that enable information/data to be presented to a vehicle occupant (e.g., a driver, a vehicle passenger, etc.) or a remote user.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, throttle system 144, a suspension system 148, a transmission system 145, and/or a navigation system 147. Each of these systems can include one or more devices, components, and/or a combination thereof, now known or later developed.

The propulsion system 141 may be a hybrid-electric vehicle propulsion system including an internal combustion engine 141a, an electric motor 141b, and one or more hybrid system batteries 141c for powering the electric motor 141b. Both the electric motor 141b and the engine 141a may be operably connected to the transmission system 145 so that both (or either) the motor 141b and engine 141a may provide power to the transmission system. The propulsion system 141 may include hardware and/or software elements enabling the electric motor 141b to operate as a generator under certain conditions, to charge the battery 141*c*. The propulsion system 141 may also include other elements.

In one or more arrangements, the transmission system 145 may be a stepped automatic transmission in a parallel hybrid system. The transmission system 145 may be configured to operably couple or engage (for example, using a clutch mechanism) the engine 141*a* to the electric motor/generator 141*b* and hybrid-electric system battery 141*c* for purposes of charging the battery. Elements of the transmission system 145, the electric motor 141*b*, and the battery 141*c* may be operably connected to the transmission system control module 117, to other modules and/or to other vehicle systems and components for purposes of controlling operation of the transmission system 145 and other vehicle components and systems to charge the battery 141*c*.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The navigation system 147 may be configured to track the path of a vehicle along a travel route. The navigation system 147 may be configured to operate in conjunction with the autonomous driving module to guide the vehicle along a travel route selected by a user.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110, any of the modules stored in memory 112, and/or any other vehicle components or systems. Any suitable actuator can be used. For instance, the one or more actuators 150 can include motors, pneumatic actuators, hydraulic pistons, relays, solenoids, and/or piezoelectric actuators, just to name a few possibilities.

In embodiments described herein, a memory 112 may store an autonomous driving module 160, a required power estimation module 124, and a transmission system control module 117. The memory 112 is a random-access memory (RAM), read-only memory (ROM), a hard-disk drive, a flash memory, or other suitable memory for storing the modules 160, 124, and 117. The modules 160, 124, and 117 are, for example, computer-readable instructions that when executed by the processor 110, cause the processor(s) 110 to perform the various functions disclosed herein. Additional modules (not shown) may also be stored in memory 112.

The vehicle 100 can include one or more modules, at least some of which are described herein. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 or another portion of the vehicle 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

"Continuous" determination, estimation, calculation, control, etc. of values of the various parameters described herein refers to determination, estimation, calculation, and control of the parameter values as soon as possible in accordance with times required for data and information acquisition and processing and decision-making. These determinations may be made constantly during operation of the vehicle 100. For example, the required power estimation module 124 may be configured to process data and other information to provide a continuously updated estimate a total vehicle power requirement for an upcoming short-term time period or travel distance of the vehicle, so that this information may be available as soon as it is needed for determining a gear to which the transmission system 145 is to be shifted The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof (e.g., one or more of vehicle systems 140). The autonomous driving module(s) 160 may be configured to autonomously control the vehicle 100 so as to drive the vehicle along a travel route, from an initial or start location to a destination.

The processor(s) 110, the autonomous driving module 160, the required power estimation module 124, the transmission system control module 117 and/or other modules described herein can be operably connected to communicate with each other and with the other elements of the vehicle, including various vehicle systems 140 and/or individual components thereof. For example, referring to FIG. 1, the processor(s) 110 and the autonomous driving module(s) 160 can be in communication to send and/or receive information from the various vehicle systems 140 to control the movement, speed, maneuvering, heading, direction, etc. of the vehicle 100. The processor(s) 110, the autonomous driving module(s) 160, the transmission system control module 117 and/or other elements of the vehicle may control some or all of the vehicle systems 140 and, thus, may be partially or fully autonomous.

The processor(s) 110, the autonomous driving module(s) 160, and the navigation system 147 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include a required power estimation module including computer-readable instructions that when executed by the one or more processors cause the processor(s) to estimate a total vehicle power requirement. The total vehicle power requirement $P_{TOTAL}$ may be an estimated power requirement for the immediate future operating needs of the vehicle, in order to move the vehicle at a predetermined speed $v_{estimated}$ as determined by the relationship:

$$P_{TOTAL} = F_{TOTAL} * v_{estimated}$$

where $F_{TOTAL}$ is an estimated total force needed to overcome road load, road grade, and other sources of resistance in propelling the vehicle at the speed $v_{estimated}$, and including a force needed to charge the hybrid-electric system battery. Thus, the estimated total vehicle power requirement may vary with the desired vehicle speed.

An estimate of the total vehicle power requirement $P_{TOTAL}$ may relate to movement of the vehicle over a predetermined distance ahead of the vehicle's current position or a predetermined distance from the vehicle's current position, for a predetermined length of time starting as soon as the estimate is determined, or for any other selected distance or length of time. The estimate of the total vehicle power requirement may be continuously recalculated for purposes of controlling shifting of the transmission as described herein.

The parameter $F_{TOTAL}$ may include a component $F_{ops}$ comprising an estimated force required to accelerate a vehicle 100 having a mass m at an acceleration rate $a_{estimated}$ estimated to be required by the vehicle moving forward from its current position:

$$F_{ops} = m * a_{estimated}$$

In one or more arrangements, the estimated required acceleration $a_{estimated}$ may be an acceleration estimated to be required for the vehicle to flow into and/or with traffic over a predetermined distance ahead of the vehicle's current position or over a length of time starting when the required acceleration is estimated.

Any of a variety of methods may be used to estimate the required acceleration. For example, in one or more arrangements, this estimated required acceleration $a_{estimated}$ may be determined from traffic flow information 165 (if available) relating to the previous accelerations of the vehicle 100 and/or other vehicles on the same stretch of road on which the vehicle 100 is currently traveling. This information may associate vehicle acceleration with time of day, time of year, weather conditions, traffic density, and/or a variety of other parameters to enable acceleration data to be matched to current conditions in which the vehicle 100 is driving. Traffic flow information 165 may be received from sources outside the vehicle and/or may be calculated or sensed by environment sensors of the vehicle 100. Traffic flow information 165 may be stored in data stores 115 for processing by required power estimation module 124 and processor(s) 110 to estimate an acceleration which may be required along the route ahead of the vehicle 100. In one or more arrangements, current location and conditions of the vehicle 100 may be matched as closely as possible to available traffic flow data and an average or weighted average of accelerations of previous vehicles at the matched location and under the matched conditions may be determined from the information. This average or weighted average acceleration may be used as the estimated required acceleration. Traffic flow information may be stored in data stores 115 and/or may be stored in one or more external location (such as cloud storage). If information is stored remotely, the information may be accessed via the vehicle wireless communications interface 169.

In one or more arrangements, if sufficient traffic flow information as described above is unavailable, the estimated required acceleration may be determined using records of acceleration of the vehicle 100 at the same geographical location during previous trips. Such information may be acquired by sensor system 120 during traversal of the same stretch of road on previous trips and stored in traffic flow information 165 or in another location in memory. The required power estimation module 124 may be configured to, in conjunction with environment sensors 122 and navigation system 147 monitor coordinates of the vehicle 100 during travel and to store in a memory values of vehicle speed, acceleration, time of day of travel, and/or other parameters for analysis to determine patterns of frequent repeated travel over the same route or through the same navigational coordinates. Data evincing repeated traversal of the same stretches of road or navigational coordinates may be stored for analysis in estimating the acceleration and speed that will be required in traveling along these routes/locations in the future, for purposes of estimating the vehicle operational power requirement as described herein.

In one or more arrangements, if sufficient traffic flow data as described above is unavailable, estimated required acceleration may be determined using records of the vehicle acceleration during the current trip and during a time period preceding a current time at which the estimated required acceleration is being determined. This may be done on the assumption that the required vehicle acceleration will not change appreciably between successive short time periods. For example, the vehicle acceleration over a time period of 30 seconds previous to a current time may be reviewed and an average or a maximum acceleration over this time period may be used as the estimated required acceleration for a time period going forward (for example, 30 or 60 seconds) from the current time. This may be particularly applicable in situations where, for example, the vehicle has been traveling at a relatively steady speed over a period of time leading up to the current time. Alternatively, other methods may be used to determine the value of the parameter $a_{estimated}$.

An estimate of the required acceleration may apply to a predetermined distance ahead of the vehicle's current position, for a predetermined distance from the vehicle's current position, for a predetermined length of time starting as soon as the estimate is determined, or for any other distance or length of time. Where the required acceleration is to apply only for a predetermined distance or length of time, the required acceleration may be re-estimated prior to expiration of the time period or traversal of the predetermined distance. This facilitates accurate re-determination of the estimated required acceleration for use in the calculations needed to estimate the total vehicle power requirement as described herein.

In one or more arrangements, the value of the parameter $a_{estimated}$ and the associated engine force $F_{ops}$ may be continuously recalculated/redetermined as the time and/or distance values used for estimating $a_{estimated}$ expire or otherwise change, for purposes of updating and estimating $F_{TOTAL}$ as described herein. Similarly, in one or more arrangements, the parameter $F_{ops}$ may be continuously recalculated/redetermined as the battery SOC changes during the charging process, for purposes of updating and estimating $F_{TOTAL}$ as described herein.

The parameter $F_{TOTAL}$ may include a battery charging power requirement component $F_{charge}$ comprising an estimated force required to charge the hybrid-electric system battery over a predetermined time period or distance of travel. The predetermined time period or distance of travel may be the same time period or distance of travel over which the parameter $a_{estimated}$ is estimated. In one or more arrangements, the force $F_{charge}$ may depend upon a state of charge (SOC) of the battery. Specifically, the transmission system control module may be configured to control charging of the battery so that the battery charges at a relatively more rapid rate (thereby demanding a relatively greater charging force $F_{charge}$) when the SOC is relatively lower. The transmission system control module may also be configured to control charging of the battery so that the battery charges at a relatively slower rate (thereby demanding a relatively lower charging force $F_{charge}$) when the SOC is relatively higher. The variation of the rate of charge with the battery SOC may be specified in a battery charge profile 197 stored in data stores or in another vehicle memory location. In one or more arrangements, the rate of charge and associated required engine force $F_{charge}$ may be continuously recalculated/redetermined as the battery SOC changes during the charging process, for purposes of updating and estimating $F_{TOTAL}$ as described herein.

The parameter $F_{TOTAL}$ may include a component $F_{roadload}$ comprising an estimated force required to overcome various forces such as aerodynamic drag, rolling resistance, internal friction between vehicle components, and other elements resisting movement of the vehicle 100 over the predetermined time period or travel distance. These forces may depend on the mass of the vehicle, vehicle velocity, and other factors. The vehicle mass and road load may be determined using any suitable methods. In one or more arrangements, the vehicle mass and road load may be determined using methods and systems set forth in U.S. Published Patent Appln. No. 2019/0039595 ("the '595 application"), the disclosure of which is incorporated herein by reference in its entirety except for any definitions, subject matter disclaimers or disavowals set forth therein to the extent that the incorporated material is inconsistent with the express disclosure herein, in which case the language in this disclosure controls. The vehicle 100 may also incorporate and/or be in communication with any sensors (for example, a 3-axis accelerometer) or other components and/or systems required to estimate or determine the vehicle mass and road load as described in the '595 application. Alternative methods of estimating or determining the vehicle mass and road load may also be employed. In one or more arrangements, the parameter $F_{roadload}$ may be continuously recalculated/redetermined as the battery SOC changes during the charging process, for purposes of updating and estimating $F_{TOTAL}$ as described herein.

The parameter $F_{TOTAL}$ may include a component $F_{grade}$ comprising an estimated force needed to move the vehicle as desired along the grade of road on which the vehicle is currently driving, and over the predetermined time period or travel distance. The road grade or slope may be determined using any suitable method, for example, using vehicle sensor data or by reference to map data. In measuring vehicle acceleration in a horizontal direction, a vehicle accelerometer value of acceleration will be affected by the road grade. Thus, in particular arrangements, the road grade may be estimated mathematically by determining a difference between vehicle acceleration as measured using an accelerometer and the acceleration calculated using the speed of vehicle tire rotation. An estimate of $F_{grade}$ may then be obtained using $F_{grade}=M*g$ (sin (grade)) where g is the gravitational constant (9.81 m/sec$^2$) and grade=the grade or inclination angle with respect to a horizontal plane.

The parameter $F_{TOTAL}$ may include a component $F_{reserve}$ comprising an estimated force required to provide a reserve acceleration component over and above the acceleration $a_{estimated}$ estimated to be required for immediate future vehicle operations. The reserve acceleration $a_{reserve}$ may provide a "safety factor" or additional acceleration capability which may be used in emergencies. The value of the parameter $a_{reserve}$ may be determined in a manner similar to that used for the parameter $a_{estimated}$ as previously described. For example, using traffic flow data, current location and conditions of the vehicle 100 may be matched as closely as possible to available traffic flow data and a maximum acceleration value (rather than an average or weighted average acceleration values) of a previous vehicle at the matched location and under the matched conditions may be determined from the data. This maximum acceleration value may be used as the estimated reserve acceleration for purposes of estimating the force component $F_{reserve}$. Alternatively, other methods may be used to determine the value of the parameter $a_{reserve}$.

In view of the above, the parameter $F_{TOTAL}$ may be expressed as:

$$F_{TOTAL}=F_{ops}+F_{roadload}+F_{grade}+F_{charge}+F_{reserve}$$

The vehicle 100 can include a transmission system control module storing computer-readable instructions that when executed by the one or more processors cause the one or more processors to estimate an available internal combustion engine power provided by the engine in each gear of a transmission system of the vehicle. After estimation of the total vehicle power requirement $P_{TOTAL}$ as previously described, the transmission system control module may determine a highest gear of the transmission system 145 that has an estimated available power at least equal to the estimated total vehicle power requirement. The transmission system control module 117 may then, responsive to a state of charge (SOC) of the battery falling below a predetermined low-charge threshold, and if the transmission system is not currently in the highest gear that has an estimated available power at least equal to the estimated total vehicle power requirement, control operation of the vehicle to shift the transmission system 145 to the highest gear that has an estimated available power $P_{gear}$ at least equal to the estimated total vehicle power requirement $P_{TOTAL}$ (i.e., $P_{gear} \geq P_{TOTAL}$). This operation of the transmission system control module may place the transmission in the highest gear which satisfies the estimated total power requirements (including charging of the battery), while also providing the desired acceleration reserve. This helps ensure that adequate power is available for both predicted driving demands at higher speeds and charging of the battery.

Figure 2:
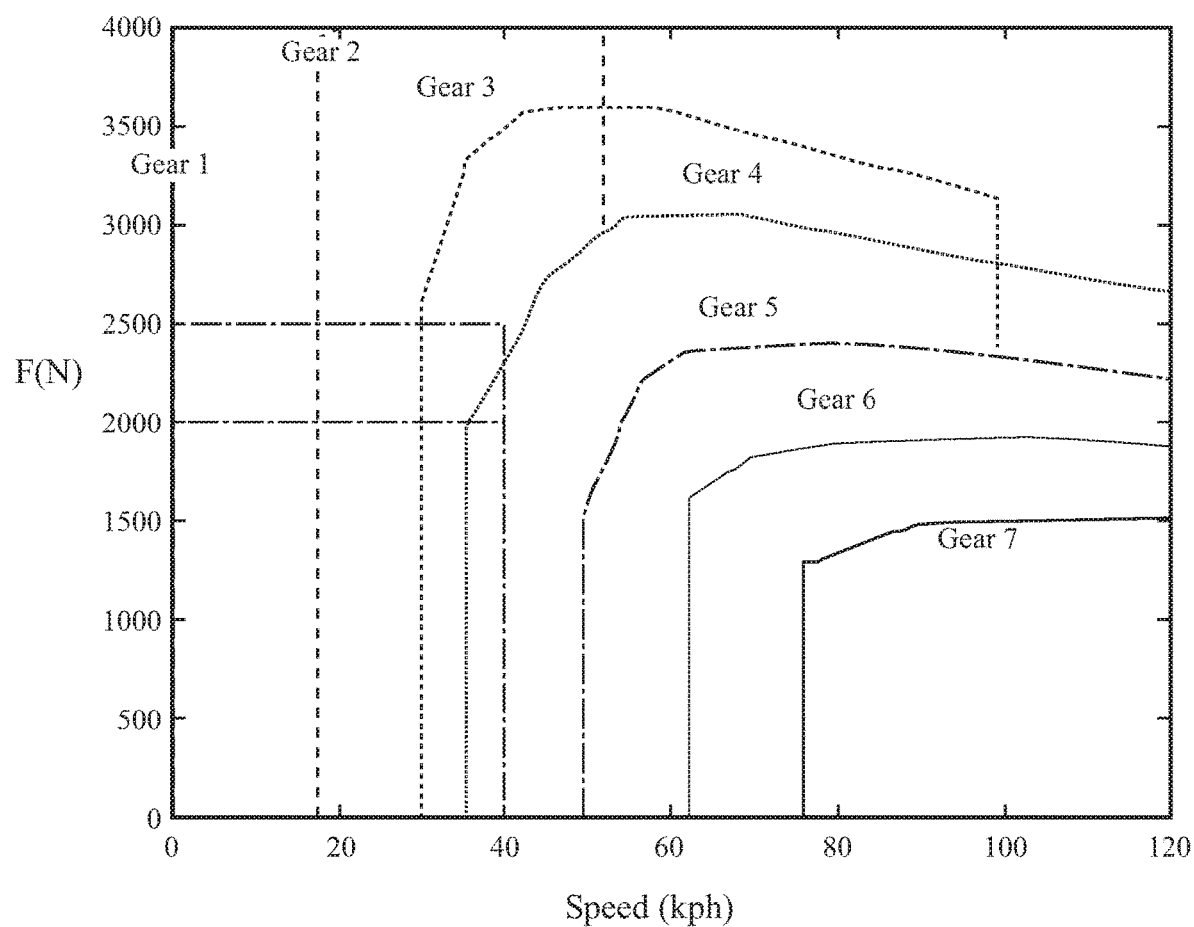
FIG. 2 is a graph showing a schematic representation of power available from an exemplary internal combustion engine in various gears of a transmission system and at various speeds of a vehicle.
Figure 3:
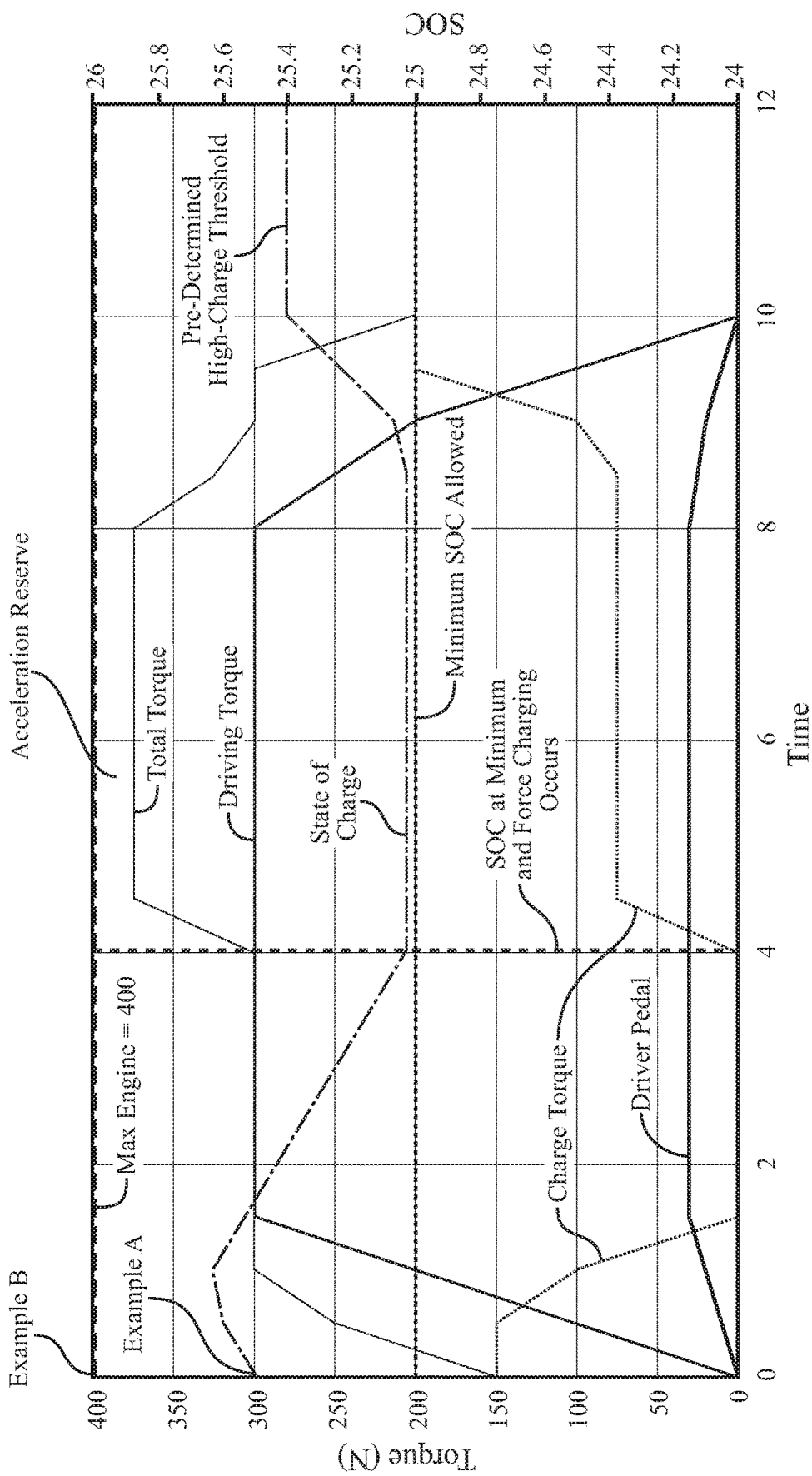
FIG. 3 is a graph showing a schematic representation of vehicle operation using a system for controlling charging of a battery in a hybrid-electric vehicle in accordance with an embodiment described herein.

FIGS. 2 and 3 illustrate operation of embodiments of the required power estimation module and the transmission system control module. FIG. 2 is a graph showing a schematic representation of power available from an exemplary internal combustion engine in various gears of a transmission system and at various speeds of a vehicle. As may be seen from FIG. 2, for a given speed, a greater total engine power or force may be available in lower gears. Specific values of engine performance parameters may depend to some degree on atmospheric pressure, engine temperature, and other factors. Data for a particular engine design may be acquired, processed, correlated and compiled into one or more functions and/or lookup tables which may be stored in internal combustion engine data 118 in data stores 115 for use by the transmission system control module 117 in estimating the available internal combustion engine power provided by the engine in each gear.

Referring to FIG. 2, to illustrate operation of the battery charging control system using a particular example, an estimated vehicle speed $v_{estimated}$ of the vehicle may be 40 kph. The transmission system 145 may currently be in $5^{th}$ gear. From the graph, the engine force available at 40 kph in $5^{th}$ gear may be about 2000 N. An estimated engine demand $F_{TOTAL}$ may be determined as previously described to be 2500 N. It may be seen that the engine may not be able to provide the total estimated power requirement 2500 N at 40 kph in $5^{th}$ gear if the battery needs charging. The transmission system control module may determine that 2500 N may be available from the engine if the transmission is shifted to $4^{th}$ gear. The transmission system control module may also determine that $4^{th}$ gear is the highest gear in which the estimated required power would be available at a speed of 40 kph. Thus, when the battery SOC falls below the predetermined low-charge threshold (thereby prompting activation of the transmission system control logic) the transmission system control module 117 may control operation of the vehicle to shift the transmission to $4^{th}$ gear.

In one or more arrangements, the rate at which the battery is charged (i.e., the required charging power) may be constant. However, continuous re-estimation of forces required from the engine 141a and the resulting power requirements may also enable the battery charge rate to be varied according to selected criteria. For example, the charging rate of the battery may be specified so that relatively more engine power is provided to charge the battery 141c at a relatively higher rate when the SOC is low. This charge rate and required power may be gradually reduced as the battery SOC rises during charging. Thus, the battery may have a non-linear charging curve (i.e., the variation in force used to charge the battery according to the current battery SOC). By shifting gears as described, a desired battery charging curve may be accommodated without adversely affecting the speed and acceleration of the vehicle.

The transmission system control module 117 may, after controlling operation of the vehicle 100 to shift the transmission system 145 to the highest gear that has an estimated available power at least equal to the estimated total vehicle power requirement, control operation of the vehicle to start charging of the battery 141c by the internal combustion engine 141a. For example, a clutch mechanism may be engaged to connect the engine 141a to the electric motor 141b. The motor may then be operated as a generator to charge the battery 141c.

The transmission system control module 117 may, after controlling operation of the vehicle 100 to shift the transmission system 145 to the highest gear that has an estimated available power at least equal to the estimated total vehicle power requirement, operate to prevent automatic shifting of the transmission system 145 out of the current gear (i.e., the highest gear providing the estimated required power) until either a higher gear has an estimated available power at least equal to the estimated total vehicle power requirement, or the state of charge of the battery 141c is at or above a predetermined high-charge threshold. This function of the transmission system control module 117 aids in ensuring that the transmission system 145 is always in the highest gear that will provide the available power, until engine power is not longer needed for charging the battery 141c. The automatic transmission system 145 may be prevented from shifting in cases where it would normally shift, so that it is maintained in a gear which can meet the estimated power requirement. This helps prevent a perception by the driver that insufficient power is being provided for moving the vehicle in cases where the battery needs charging and engine power is diverted for battery charging.

Continuous re-estimation of forces required by the engine 141a and the resulting power requirements may enable shifting of the transmission system 145 to higher and higher gears as the battery charges, until the battery 141c is charged to a predetermined high-charge level. This helps ensure that the transmission system 145 is always in a gear optimized both for vehicle operation and for battery charging.

The transmission system control module 117 may also control operation of the vehicle 100 to continue charging of the battery 141c by the internal combustion engine 141a until the state of charge of the battery is at or above a predetermined high charge threshold. Responsive to the state of charge of the battery being at or above the predetermined high charge threshold, the transmission system control module 117 may enable automatic shifting of the transmission system 145 out of the current gear of the transmission system. Thus, normal automatic shifting of the transmission system 145 may be enabled when the battery charge has reached the high-charge threshold.

In certain cases, when a need for charging the battery 141c is determined, the transmission system 145 may already be in the highest gear that has an estimated available power at least equal to the estimated total vehicle power requirement. The transmission system control module 117 may, if the current gear of the transmission system 145 is already the highest gear that has an estimated available power at least equal to the estimated total vehicle power requirement, control operation of the vehicle 100 to start charging of the battery 141c by the internal combustion engine 141a when the state of charge of the battery falls below the predetermined low-charge threshold. The transmission system control module 117 may then control operation of the vehicle 100 so as to prevent automatic shifting of the transmission system 145 out of the current gear until either a higher gear has an estimated available power at least equal to the estimated total vehicle power requirement, or the state of charge of the battery is at or above a predetermined high-charge threshold.

In particular arrangements, the transmission system control module 117 may, when a higher gear of the transmission system 145 has an estimated available power at least equal to the estimated total vehicle power requirement, control operation of the vehicle 100 to shift the transmission system 145 to the higher gear only after passage of a predetermined time period following a determination that the higher gear has an estimated available power at least equal to the estimated total vehicle power requirement. This function imposes a time delay on shifting of the gears. This delay is intended to prevent a perception in the driver that the gears are "shift-hunting" or upshifting and/or downshifting more frequently than the driver feels is necessary. Such a perception may make the driver believe that the transmission is malfunctioning.

A predetermined time period used for time-dependent information acquisition and processing and control parameters as described herein may be any desired time period. The predetermined time periods associated with different time-dependent conditions may be independent of each other (i.e., the time periods over which different parameters are measured need not overlap in time or relate to the same span of time). Thus, the time periods over which different parameters are measured may begin and/or end at different times.

In examples, the speed and the acceleration of the vehicle 100 may be measured over a predetermined time period of 30 seconds. Speed and acceleration data acquired during this time period may be used to estimate vehicle speed and acceleration requirements during a future time period of the vehicle either contiguous with or close in time to the previous 30-second time period.

In one or more arrangements, the predetermined time periods used for different time-related parameters may be equal. In other arrangements, the predetermined time periods used for two or more different conditions may differ from each other. For example, a time period over which data is acquired for estimation of future speed and/or acceleration may be different from a time delay between detection of a need to shift the transmission to a higher gear and the associated shifting of the transmission, following the battery SOC dropping below a predetermined low-charge threshold.

FIG. 3 is a graph showing a schematic representation of vehicle operation using a system for controlling charging of a battery in a hybrid-electric vehicle in accordance with an embodiment described herein. Operations shown are expressed in terms of variations of torque exerted by the engine and battery SOC over time. Available engine torque may be readily converted to available force using known methods.

Referring to FIG. 3, in the example shown, in a first (relatively higher) gear (labeled "Example A") of the transmission 145, the maximum available engine torque may be about 300 N. The battery state of charge (SOC) predetermined low-charge threshold may be set at about 25% of the full battery charge level. When the SOC is above this level, the charging torque applied to the applied to the battery may fall to zero or close to zero. Thus, when the battery charge is sufficiently high, the torque generated by the engine 141a may be directed to meeting driving and other non-charging requirements (as indicated by the line labeled "driving torque"). When the battery SOC falls to or below the predetermined low-charge threshold, part of the torque generated by the engine begins to be diverted to battery charging (i.e., the charge torque rises). This may stabilize the SOC and prevent a further drop in the SOC. However, if the driving torque demand has not diminished, more torque is required from the engine 141a to both meet the driving demand and charge the battery. As seen in FIG. 3, this may cause the total torque demand (analogous to $F_{TOTAL}$) to rise above the available engine torque of 300 N.

However, if the gear is shifted to a lower gear (line labeled "Example B") having an estimated available torque of 400 N prior to charging of the battery and selected to be the highest gear that has an estimated available power at least equal to the estimated total vehicle power requirement, it may be seen that the total torque demand may be provided by the engine when the transmission is in the new gear until the state of charge of the battery is at or above the predetermined high-charge threshold, at which time the charging torque may be diminished or eliminated.

Figure 4:
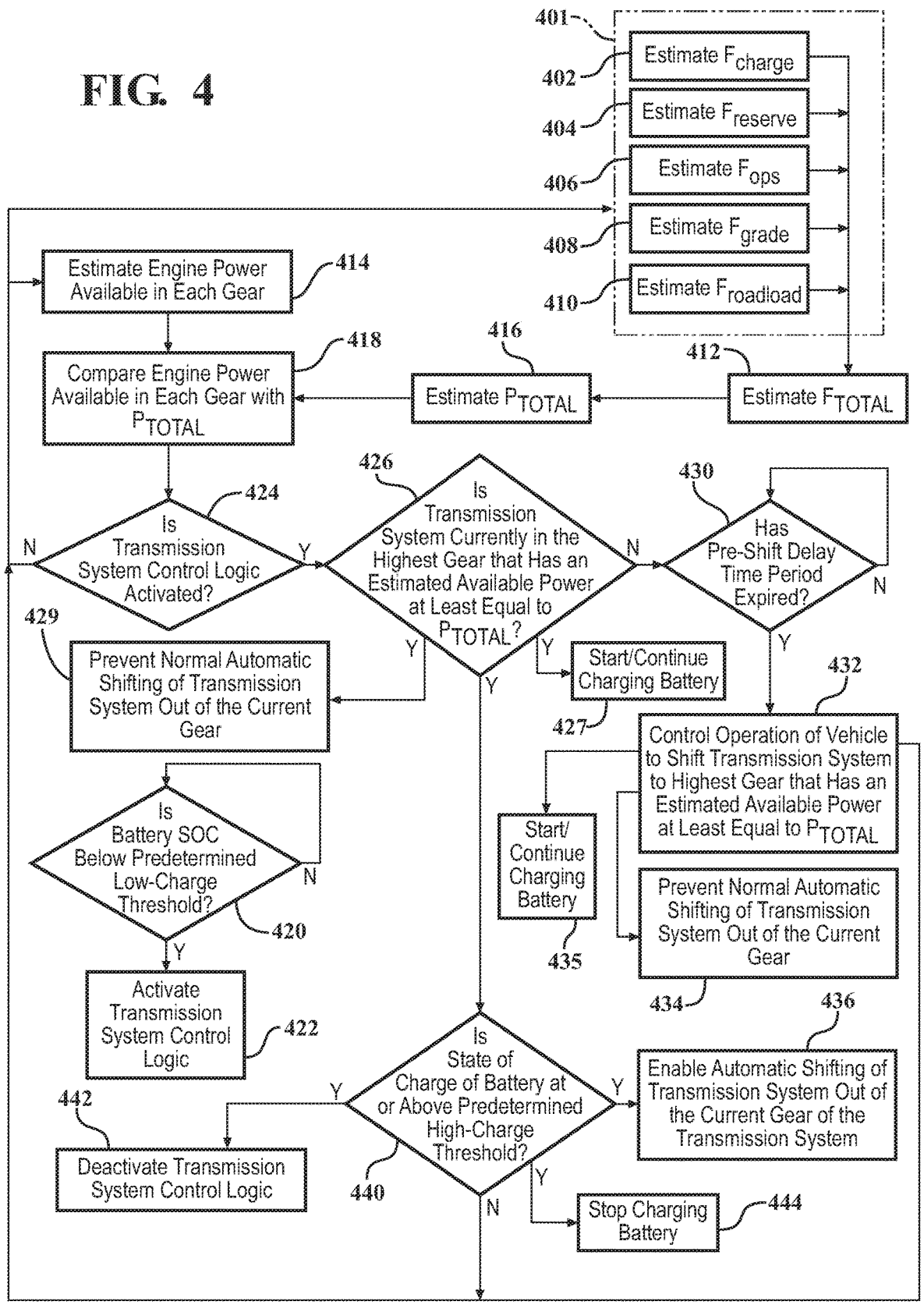
FIG. 4 is a flow diagram illustrating operation of a system for controlling charging of a battery in a hybrid-electric vehicle in accordance with an embodiment described herein.

FIG. 4 is a flow diagram illustrating operation of a system for controlling charging of a battery in a hybrid-electric vehicle in accordance with an embodiment described herein. In FIG. 4, blocks $F_{ops}$, $F_{reserve}$, $F_{roadload}$, $F_{grade}$, and $F_{charge}$, are shown aggregated in block 401. These blocks may be performed simultaneously and continuously.

In blocks 402-412 and 416, values of the parameters $F_{ops}$, $F_{reserve}$, $F_{TOTAL}$, $F_{roadload}$, $F_{grade}$, $F_{charge}$, $F_{reserve}$, and $P_{TOTAL}$ may be estimated as previously described. In block 414, the engine power available in each gear may be estimated as previously described. In block 418, the transmission system control module may compare the engine power available in each gear with $P_{TOTAL}$. Simultaneously with performance of blocks 402-418, the transmission system control module 117 may continuously monitor the battery state of change in block 420 to detect when the battery SOC falls below the predetermined low-charge threshold. If the battery SOC falls below the predetermined low-charge threshold, the transmission system control module 117 may (in block 422) activate the control logic. Blocks 402-420 may be continuously performed prior to the battery SOC falling below the predetermined low-charge threshold, so that any shifting of the transmission gears to provide required power may be implemented as soon as possible after the battery level drops.

In block 424, the transmission system control module 117 may determine if the control logic is currently activated (by the SOC falling below the predetermined low-charge threshold). If the control logic is not activated, control may transfer back to the blocks in aggregate block 401 and also to block 414. However, if the control logic is activated, the transmission system control module 117 may (in block 426) determine if the transmission system 145 is currently in the highest gear that has an estimated available engine power at least equal to $P_{TOTAL}$. If the transmission system 145 is currently in the highest gear that has an estimated available engine power at least equal to $P_{TOTAL}$, then the transmission system 145 does not need to be shifted to reach the highest gear. Then the transmission system control module 117 may (in block 427) control operation of the vehicle to begin charging the battery. The transmission system control module 117 may also (in block 429) prevent normal automatic shifting of the transmission system 145, because the transmission system is being controlled by the battery charge control logic while the battery is being charged. Therefore, in cases where the automatic transmission may normally shift gears during vehicle operation, the transmission may be prevented from shifting out of the current gear (if the current gear is the highest gear that has an estimated available engine power at least equal to $P_{TOTAL}$) unless a higher gear has an estimated available power at least equal to $P_{TOTAL}$, or unless the battery SOC reaches the predetermined high-charge threshold. The transmission system control module 117 may also (in block 440) determine if the state of charge of the battery is at or above the predetermined high-charge threshold. If the state of charge of the battery is at or above the predetermined high-charge threshold, the transmission system control module may (in block 442) deactivate the transmission system control logic. This may return the transmission system to a normal operational status, by permitting (in block 436) normal shifting of the automatic transmission according to operational demands. In addition, the transmission system control module may (in block 444) control operation of the vehicle somas to stop charging of the battery. However, if the state of charge of the battery is not at or above the predetermined high-charge threshold, control may pass back to blocks 401 and 414, where the power requirement and estimated available engine power parameters may be updated.

Returning to block 426, if the transmission is not currently in the highest gear that has an estimated available engine power at least equal to $P_{TOTAL}$, the transmission system control module 117 may (in block 430) determine if any applicable pre-shift delay time period has expired. When the time period expires, the transmission system control module may (in block 432) control operation of the vehicle 100 to shift the transmission system to the highest gear that has an estimated available power at least equal to $P_{TOTAL}$. The transmission system control module may then (in block 434) prevent normal automatic shifting of the transmission system 145 as previously described. The transmission system control module 117 may also (in block 435) control operation of the vehicle to start or continue charging of the battery. Control may also be directed to blocks 401 and 414 for updating of parameters.

As described above, the battery charging control system may determine the highest gear that has an estimated available power at least equal to $P_{TOTAL}$ and control operation of the vehicle to maintain it in the highest such gear until the battery is recharged.

In addition, as described herein, a non-transitory computer readable medium is provided for controlling charging of a battery in a hybrid-electric vehicle by an internal combustion engine of the vehicle. The medium stores instructions that when executed by one or more processors cause the one or more processors to estimate a total vehicle power requirement. An estimate of an available internal combustion engine power provided by the engine in each gear of a transmission system of the vehicle may be determined. A highest gear of the transmission system that has an estimated available power at least equal to the estimated total vehicle power requirement may be determined. A determination may be made that a state of charge of the battery has fallen below a predetermined low-charge threshold. If the vehicle transmission system is not in the highest gear that has an estimated available power at least equal to the estimated total vehicle power requirement when the state of charge falls below the predetermined low-charge threshold, operation of the vehicle may be controlled to shift the transmission system to the highest gear that has an estimated available power at least equal to the estimated total vehicle power requirement after the state of charge falls below the predetermined low-charge threshold. Then, operation of the vehicle may be controlled to start charging of the battery by the internal combustion engine. If a current gear the transmission system is in the highest gear that has an estimated available power at least equal to the estimated total vehicle power requirement when the state of charge falls below the predetermined low-charge threshold, operation of the vehicle may be controlled to start charging of the battery by the internal combustion engine. In addition, operation of the vehicle may be controlled so as to prevent automatic shifting of the transmission system out of the current gear until a gear higher than the current gear has an estimated available power at least equal to the estimated total vehicle power requirement. Also, operation of the vehicle may be controlled to charge the battery until the state of charge of the battery is at or above a predetermined high-charge threshold.

In addition, as described herein, a method for charging a battery in a hybrid-electric vehicle is provided. The method comprises steps of continuously estimating a total vehicle power requirement, continuously estimating an available internal combustion engine power provided by the engine in each gear of a transmission system of the vehicle, and continuously determining a highest gear of the transmission system that has an estimated available power at least equal to the estimated total vehicle power requirement. The method also includes determining when a state of charge of the battery has fallen below a predetermined low-charge threshold. The method also includes a step of, if the transmission system is not in the highest gear that has an estimated available power at least equal to the estimated total vehicle power requirement when the state of charge falls below the predetermined low-charge threshold, controlling operation of the vehicle to shift the transmission system to the highest gear that has an estimated available power at least equal to the estimated total vehicle power requirement after the state of charge falls below the predetermined low-charge threshold. The method also includes a step of, after shifting the gear, controlling operation of the vehicle to start charging of the battery by the internal combustion engine. The method also includes a step of, if a current gear the transmission system is in the highest gear that has an estimated available power at least equal to the estimated total vehicle power requirement when the state of charge falls below the predetermined low-charge threshold, controlling operation of the vehicle to start charging of the battery by the internal combustion engine. The method also includes steps of continuously controlling operation of the vehicle so as to prevent automatic shifting of the transmission system out of the current gear until a gear higher than the current gear has an estimated available power at least equal to the estimated total vehicle power requirement, and continuously controlling operation of the vehicle to charge the battery until the state of charge of the battery is at or above a predetermined high-charge threshold.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling charging of a battery in a hybrid-electric vehicle, the system comprising:
   one or more processors; and
   a memory communicably coupled to the one or more processors and storing:

a required power estimation module including computer-readable instructions that when executed by the one or more processors cause the one or more processors to estimate a total vehicle power requirement; and a transmission system control module including computer-readable instructions that when executed by the one or more processors cause the one or more processors to:

estimate an available internal combustion engine power provided by a vehicle internal combustion engine in each gear of a transmission system of the vehicle;

determine a highest gear of the transmission system that has an estimated available power at least equal to the estimated total vehicle power requirement; and responsive to a state of charge of the battery falling below a predetermined low-charge threshold, if the transmission system is not currently in the highest gear that has an estimated available power at least equal to the estimated total vehicle power requirement, control operation of the vehicle to shift the transmission system to the highest gear that has an estimated available power at least equal to the estimated total vehicle power requirement.

2. The system of claim 1 wherein the transmission system control module includes computer-readable instructions that when executed by the one or more processors cause the one or more processors to, after controlling operation of the vehicle to shift the transmission system to the highest gear that has an estimated available power at least equal to the estimated total vehicle power requirement, control operation of the vehicle to start charging of the battery by the internal combustion engine.

3. The system of claim 2 wherein the transmission system control module includes computer-readable instructions that when executed by the one or more processors cause the one or more processors to prevent automatic shifting of the transmission system out of a current gear of the transmission system until either a higher gear has an estimated available power at least equal to the estimated total vehicle power requirement, or the state of charge of the battery is at or above a predetermined high-charge threshold.

4. The system of claim 2 wherein the transmission system control module includes computer-readable instructions that when executed by the one or more processors cause the one or more processors to:

control operation of the vehicle to continue charging of the battery by the internal combustion engine until the state of charge of the battery is at or above a predetermined high charge threshold; and responsive to the state of charge of the battery being at or above the predetermined high charge threshold, enable automatic shifting of the transmission system out of a current gear of the transmission system.

5. The system of claim 1 wherein the transmission system control module includes computer-readable instructions that when executed by the one or more processors cause the one or more processors to:

if a current gear of the transmission system is the highest gear that has an estimated available power at least equal to the estimated total vehicle power requirement, control operation of the vehicle to start charging of the battery by the internal combustion engine when the state of charge of the battery falls below the predetermined low-charge threshold; and control operation of the vehicle so as to prevent automatic shifting of the transmission system out of the current gear until either a higher gear has an estimated available power at least equal to the estimated total vehicle power requirement, or the state of charge of the battery is at or above a predetermined high-charge threshold.

6. The system of claim 5 wherein the transmission system control module includes computer-readable instructions that when executed by the one or more processors cause the one or more processors to, when a higher gear has an estimated available power at least equal to the estimated total vehicle power requirement, control operation of the vehicle to shift the transmission system to the higher gear after passage of a predetermined time period following a determination that the higher gear has an estimated available power at least equal to the estimated total vehicle power requirement.

7. The system of claim 5 wherein the transmission system control module includes computer-readable instructions that when executed by the one or more processors cause the one or more processors to:

control operation of the vehicle to continue charging of the battery by the internal combustion engine until the state of charge of the battery is at or above a predetermined high charge threshold; and responsive to the state of charge of the battery being at or above the predetermined high charge threshold, enable automatic shifting of the transmission system out of a current gear of the transmission system.

8. A non-transitory computer-readable medium for controlling charging of a battery in a hybrid-electric vehicle by an internal combustion engine of the vehicle, the medium storing instructions that when executed by one or more processors cause the one or more processors to:

estimate a total vehicle power requirement;

estimate an available internal combustion engine power provided by a vehicle internal combustion engine in each gear of a transmission system of the vehicle;

determine a highest gear of the transmission system that has an estimated available power at least equal to the estimated total vehicle power requirement; and determine that a state of charge of the battery has fallen below a predetermined low-charge threshold;

if the transmission system is not in the highest gear that has an estimated available power at least equal to the estimated total vehicle power requirement when the state of charge falls below the predetermined low-charge threshold:

controlling operation of the vehicle to shift the transmission system to the highest gear that has an estimated available power at least equal to the estimated total vehicle power requirement after the state of charge falls below the predetermined low-charge threshold; and controlling operation of the vehicle to start charging of the battery by the internal combustion engine;

if a current gear the transmission system is in the highest gear that has an estimated available power at least equal to the estimated total vehicle power requirement when the state of charge falls below the predetermined low-charge threshold:

controlling operation of the vehicle to start charging of the battery by the internal combustion engine; and controlling operation of the vehicle so as to prevent automatic shifting of the transmission system out of the current gear until a gear higher than the current gear has an estimated available power at least equal to the estimated total vehicle power requirement; and controlling operation of the vehicle to charge the battery until the state of charge of the battery is at or above a predetermined high-charge threshold.

9. The non-transitory computer-readable medium for of claim 8 wherein the medium stores instructions that when executed by one or more processors cause the one or more processors to control operation of the vehicle to shift the transmission system out of a current gear to a higher gear having an estimated available power at least equal to the estimated total vehicle power requirement after passage of a predetermined time period following a determination that the higher gear has an estimated available power at least equal to the estimated total vehicle power requirement.

10. A method for charging a battery in a hybrid-electric vehicle, comprising steps of:
   continuously estimating a total vehicle power requirement; and
   continuously estimating an available internal combustion engine power provided by a vehicle internal combustion engine in each gear of a transmission system of the vehicle;
   continuously determining a highest gear of the transmission system that has an estimated available power at least equal to the estimated total vehicle power requirement; and
   determining that a state of charge of the battery has fallen below a predetermined low-charge threshold;
   if the transmission system is not in the highest gear that has an estimated available power at least equal to the estimated total vehicle power requirement when the state of charge falls below the predetermined low-charge threshold:
   controlling operation of the vehicle to shift the transmission system to the highest gear that has an estimated available power at least equal to the estimated total vehicle power requirement after the state of charge falls below the predetermined low-charge threshold; and
   controlling operation of the vehicle to start charging of the battery by the internal combustion engine;
   if a current gear the transmission system is in the highest gear that has an estimated available power at least equal to the estimated total vehicle power requirement when the state of charge falls below the predetermined low-charge threshold:
   controlling operation of the vehicle to start charging of the battery by the internal combustion engine;
   continuously controlling operation of the vehicle so as to prevent automatic shifting of the transmission system out of the current gear until a gear higher than the current gear has an estimated available power at least equal to the estimated total vehicle power requirement; and
   continuously controlling operation of the vehicle to charge the battery until the state of charge of the battery is at or above a predetermined high-charge threshold.

11. The method of claim 10 further comprising the step of controlling operation of the vehicle to shift the transmission system out of a current gear to a higher gear having an estimated available power at least equal to the estimated total vehicle power requirement after passage of a predetermined time period following a determination that the higher gear has an estimated available power at least equal to the estimated total vehicle power requirement.

12. The method of claim 10 further comprising a step of controlling operation of the vehicle to shift the transmission system after passage of a predetermined time period following falling of the state of charge of the battery below the predetermined low-charge threshold.

* * * * *